United States Patent
Moni et al.

(10) Patent No.: US 7,436,889 B2
(45) Date of Patent: *Oct. 14, 2008

(54) METHODS AND SYSTEMS FOR REDUCING REQUANTIZATION-ORIGINATED GENERATIONAL ERROR IN PREDICTIVE VIDEO STREAMS USING MOTION COMPENSATION

(75) Inventors: Shankar Moni, San Jose, CA (US); John A. Tardif, San Jose, CA (US)

(73) Assignee: Microsoft Corporation, Redmond, WA (US)

(*) Notice: Subject to any disclaimer, the term of this patent is extended or adjusted under 35 U.S.C. 154(b) by 949 days.

This patent is subject to a terminal disclaimer.

(21) Appl. No.: 10/867,268

(22) Filed: Jun. 14, 2004

(65) Prior Publication Data

US 2004/0223546 A1   Nov. 11, 2004

Related U.S. Application Data

(63) Continuation of application No. 09/882,736, filed on Jun. 15, 2001, now Pat. No. 6,804,299.

(51) Int. Cl.
*H04N 7/12*   (2006.01)

(52) U.S. Cl. .............. 375/240.03; 375/240; 375/240.01; 375/240.12

(58) Field of Classification Search ................ 375/240, 375/240.01, 240.02, 240.03, 240.12
See application file for complete search history.

(56) References Cited

U.S. PATENT DOCUMENTS 6,775,325  B1 *   8/2004   Florencio ............... 375/240.03

* cited by examiner

*Primary Examiner*—Allen Wong
(74) *Attorney, Agent, or Firm*—Workman Nydegger

(57) ABSTRACT

Adaptive compensation for requantization. A reference picture is decoded. Another copy of the reference picture is then requantized and then decoded. Next, an error picture is calculated and stored. The error picture represents the difference between the reference picture as decoded without requantization and the reference picture as decoded with requantization. The error picture and the requantized reference picture are used to generate a predictive picture that at least partially compensates for generational error introduced by requantization. This compensation for error may be adaptively performed based on system conditions.

36 Claims, 8 Drawing Sheets

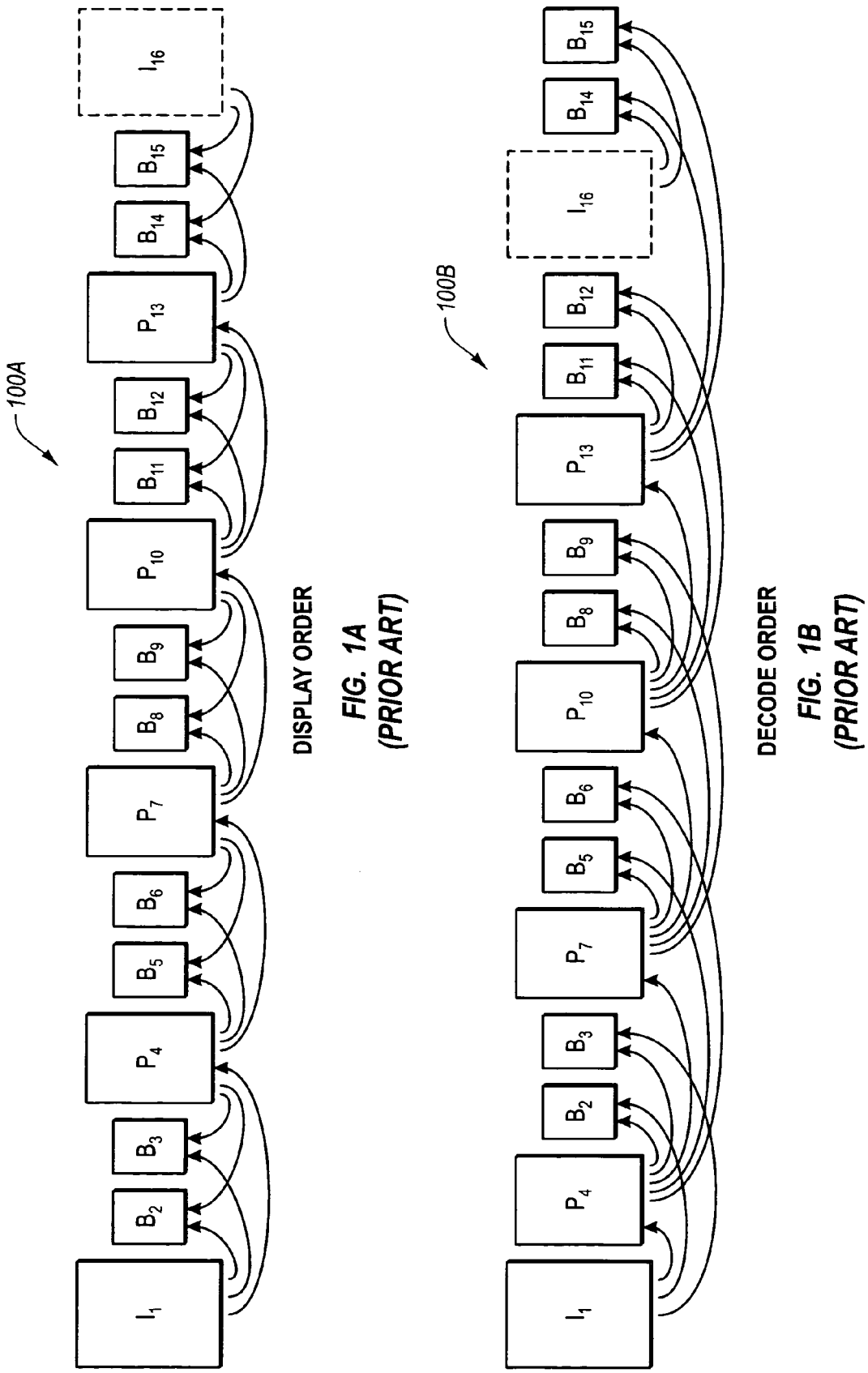
FIG. 1A (PRIOR ART) DISPLAY ORDER
FIG. 1B (PRIOR ART) DECODE ORDER

| | | | | |
|---|---|---|---|---|
| Time 14 → | $P^3$ | | | |
| Time 13 → | | $P^1$ | | |
| Time 12 → | | | $P^2$ | |
| Time 11 → | | | | $P^3$ |
| Time 10 → | $P^1$ | | | |
| Time 9 → | | $P^2$ | | |
| Time 8 → | | | $P^3$ | |
| Time 7 → | | | | $P^1$ |
| Time 6 → | $P^2$ | | | |
| Time 5 → | | $P^3$ | | |
| Time 4 → | $I^3$ | | $P^1$ | |
| Time 3 → | - | | | $P^2$ |
| Time 2 → | - | | $I^2$ | - |
| Time 1 → | | $P^1$ | - | - |
| Time 0 → | $I^1$ | - | - | - |
| | ↑ | ↑ | ↑ | ↑ |
| | Buffer 1 | Buffer 2 | Buffer 3 | Buffer 4 |

*FIG. 8*

METHODS AND SYSTEMS FOR REDUCING REQUANTIZATION-ORIGINATED GENERATIONAL ERROR IN PREDICTIVE VIDEO STREAMS USING MOTION COMPENSATION

CROSS-REFERENCE TO RELATED APPLICATIONS

The present application is a continuation application of U.S. patent application Ser. No. 09/882,736, filed Jun. 15, 2001, entitled, "Methods and Systems for Reducing Requantization-Originated Generational Error in Predictive Video Streams Using Motion Compensation," which is incorporated herein by reference.

BACKGROUND OF THE INVENTION

1. The Field of the Invention

The present invention relates to the field of video processing. In particular, the present invention relates to the field of reducing generational error caused by requantization of a predictive video stream using motion compensation.

2. Background and Relevant Art

Video constitutes a series of images that, when displayed above a certain rate, gives the illusion to a human viewer that the image is moving. Video is now a widespread medium for communicating information whether it be a television broadcast, a taped program, or the like. More recently, digital video has become popular.

An uncompressed digital video stream has high bandwidth and storage requirements. For example, the raw storage requirement for uncompressed CCIR-601 resolution 4:2:2: serial digital video is approximately 20 megabytes per second. In addition, associated audio and data channels also require bandwidth and storage. From a transmission bandwidth perspective, 20 megabytes per second is much faster than conventional transmission techniques can practicably support. In addition, from a storage perspective, a two-hour movie would occupy approximately 144 Gigabytes of memory, well above the capabilities of a conventional Digital Versatile Disk (DVD). Therefore, what were desired were systems and methods for compressing (or coding) digital video in a way that maintains a relatively high degree of fidelity with the original video once uncompressed (or decoded).

One conventional high-quality compression standard is called MPEG-2, which is based on the principle that there is a large degree of visual redundancy in video streams. By removing much of the redundant information, the video storage and bandwidth requirements are significantly reduced.

FIG. 1A illustrates a display order 100A of a sequence of pictures. If the video stream represents progressive video, the pictures represent individual progressive frames. If the video stream represents interlaced video, the pictures represent individual interlaced frames containing two fields each.

Under the MPEG-2 standard, there are three classes of pictures, I-pictures, P-pictures and B-pictures. While MPEG-2 allows for a number of display orders, the display order illustrated in FIG. 1A is commonly used. In this common display order, there are a series of I-pictures. For clarity, only I-pictures $I_1$ and $I_{16}$ are shown in FIG. 1A. Each consecutive I-picture pair has four P-pictures interspersed there between. For example, P-pictures $P_4$, $P_7$, $P_{10}$ and $P_{13}$ are interspersed between consecutive I-pictures $I_1$ and $I_{16}$. In addition, two B-pictures are interspersed between each I-picture and each of its neighboring P-pictures. Two B-pictures are also interspersed between each consecutive P-picture pair. For example, B-pictures $B_2$ and $B_3$ are interspersed between I-picture $I_1$ and P-picture $B_4$, B-pictures $B_5$ and $B_6$ are interspersed between P-pictures $P_4$ and $P_7$, B-pictures $B_8$ and $B_9$ are interspersed between P-pictures $P_7$ and $P_{10}$, B-pictures $B_{11}$ and $B_{12}$ are interspersed between P-pictures $P_{10}$ and $P_{13}$, and B-pictures $B_{14}$ and $B_{15}$ are interspersed between P-picture $P_{13}$ and I-picture $I_{16}$.

The I-pictures are "intra-coded" meaning that they can be restructured without reference to any other picture in the video stream.

The P-pictures are "inter-coded" meaning that they may only be restructured with reference to another reference picture. Typically, the P-picture may include motion vectors that represent estimated motion with respect to the reference picture. The P-picture may be reconstructed using the immediately preceding I-picture or P-picture as a reference. In FIG. 1A, arrows illustrate the predictive relationship between pictures wherein the picture at the head of the arrow indicates the predictive picture, and the picture at the tail of the arrow indicates the reference picture used to reconstruct the predictive picture. For example, the reconstruction of P-picture $P_7$ uses P-picture $P_4$ as a reference.

B-pictures are also inter-coded. The B-picture is typically reconstructed using the immediately preceding I-picture or P-picture as a reference, and the immediately subsequent I-picture or P-picture as a reference. For example, the reconstruction of B-picture $B_{14}$ uses P-picture $P_{13}$ and I-picture $I_{16}$ as references.

FIG. 1B illustrates the decode order 100B of the pictures. The decode order is similar to the display order except that reference frames are decoded prior to any predictive pictures that rely on the reference picture, even if the reference picture is displayed after the predictive picture. Thus, the arrows in FIG. 1B are all rightward facing.

FIG. 2A illustrates the general process involved with encoding a digital picture 201 using an encoder 200A that is compatible with the MPEG-2 standard. If the digital picture is to be an I-picture, the digital picture bypasses the motion estimator 202 and is provided to the discrete cosine transformation unit (DCT) 203, which transforms the digital picture, on a block-by-block basis, from a spatial representation of an image to a frequency representation of the image. The frequency representation is then passed to a quantization unit 204, which quantizes each frequency, on a macroblock-by-macroblock basis, into definable ranges. A "macroblock" is a 16-pixel by 16-pixel array within the picture. The quantized image is then passed to a variable length coder 205 which performs, for example, variable length Huffman coding on the resulting quantized image. The reduced sized I-picture is then stored or transmitted for subsequent decoding.

If the digital picture 201 is to be a P-picture, the encoding process is similar as for I-pictures with several notable exceptions. If a P-picture, the digital picture is passed first to the motion estimator 202. For each macroblock (i.e., 16×16 pixel array) in the P-picture, the motion estimator 202 finds a close visual match to the macroblock in the reference picture. The motion estimator 202 then represents the macroblock in the P-picture as a motion vector representing the motion between the macroblock in the P-picture and the close visual match 16×16 pixel array in the reference picture. In addition to the motion vector, a difference macroblock is calculated representing the difference between the macroblock in the P-picture and the close match 16×16 pixel array in the reference frame. A macroblock represented as a difference with corresponding motion vectors is typically smaller than a macroblock represented without motion vectors. Discrete cosine transformation and quantization are then performed on just the difference representation of the P-picture. Then, the difference information is combined with the motion vectors before variable length coding is performed.

B-pictures are encoded similar to how P-pictures are encoded, except that motion may be estimated with reference to a prior reference picture and a subsequent reference picture.

FIG. 2B illustrates a conventional decoder 200B in conformance with the MPEG-2 standard. First, a variable length decoder 215 performs, for example, variable length decoding on the picture. The picture (or the difference data of the picture if a P-picture or a B-picture) is passed to the inverse quantizor 214 for inverse quantization on a macroblock-by-macroblock basis. Next, an inverse discrete cosine transformer 213 performs inverse discrete cosine transformation on the frequency representation of the picture, on a block-by-block basis, to reconstruct the spatial representation of the picture. The spatial representation of the picture is passed to the motion compensator 212 where the spatial representation is combined with the motion vectors (if a P-picture or B-picture) to thereby reconstruct the digital picture 201'. The reconstructed digital picture 201' is labeled differently than the original picture 201 to represent that there may be some loss in the encoding process.

In this manner, MPEG-2 combines the functionality of motion compensation, discrete cosine transformation, quantization, and variable length coding to significantly reduce the size of a video stream with some generally acceptable reduction in video quality. Despite conventional standards such as MPEG-2 that provide significant compression to a video stream, it is desirable to reduce the bandwidth requirements of the video stream even more to maximize network and storage performance.

One known method for reducing the bandwidth requirements even further is to perform variable length decoding on the video stream, perform inverse quantization, then perform requantization at a coarser scale, and then perform variable length encoding. The requantized values require fewer bits to represent than the originally quantized values. Thus, the video stream bandwidth requirements are reduced.

While requantization results in decreased bandwidth requirements, requantization also results in some lost data thereby decreasing the quality of the corresponding picture to some extent. This loss in quality is compounded in predictive video streams since a predictive picture may rely on a chain of reference pictures, each subject to requantization error. For example, P-picture $P_{13}$ is predicted from P-picture $P_{10}$. If P-picture $P_{10}$ has inaccuracies, these inaccuracies will be propagated to P-picture $P_{13}$. In addition, P-picture $P_{10}$ is predicted from P-picture $P_7$, P-picture $P_7$ is predicted from P-picture $P_4$, and P-picture $P_4$ is predicted from I-picture $I_1$. Error introduced to any of these pictures will propagate down the entire predictive chain. Thus, P-picture $P_{13}$ may include error propagated from I-picture $I_1$ and P-pictures $P_4$, $P_7$ and $P_{10}$. This propagated error is called "generational" error.

While the incremental error introduced by a single requantization to a single picture may be unperceivable to a human viewer, when the requantization error is compounded due to these generational effects, there can be a significant loss in quality. Therefore, what are desired are systems and methods for reducing generational error caused by requantization of a predictive video stream.

BRIEF SUMMARY OF THE INVENTION

The present invention extends to both methods and systems for at least partially avoiding generational error due to requantization of video streams that use predictive inter-picture motion compensation. For example, as described above, the MPEG-2 standard developed by the Moving Pictures Experts Group defines three classes of pictures; I-pictures, P-pictures, and B-pictures. The I-pictures may be decoded without reference to any other pictures. P-pictures use a previous I-picture or P-picture as a reference frame during decoding. B-pictures may use a previous and possibly a subsequent I-picture or P-picture during decoding. The requantization may be adaptively performed based on a variety of factors such as the type of picture (e.g., I, P or B), the current network traffic of the network over which the potentially requantized picture is to traverse, and the storage availability for storing error pictures used to compensate for requantization error.

First, a reference picture that has been previously quantized is accessed and decoded. The reference picture is requantized using, for any given macroblock, a coarser quantization scale than what was used during the original encode process. Then, the requantized reference picture is decoded. Next, an error picture is calculated and stored. The error picture represents the difference between the reference picture as decoded without requantization and the reference picture as decoded with requantization.

Next, a predictive picture is accessed that is predicted from the reference picture. The predictive picture includes a number of components such as 16-pixel by 16-pixel macroblocks. Each macroblock includes one or more motion vectors representing estimated motion between the macroblock and a visually similar component piece in the reference picture. Each macroblock also includes a motion compensated residual component representing the difference between the macroblock in the predictive picture and the visually similar component piece in the reference picture.

For each motion compensated residual component, the motion vectors are used to extract the portion of the stored error reference picture that corresponds to the visually similar component in the reference picture. Then, the motion compensated residual component is added to the extracted portion of the stored error picture to thereby form an altered predictive picture that represents a closer approximation of the predictive picture as it would appear after decoding if the reference picture had not been requantized. Thus, the altered predictive picture has a reduced level of requantization-induced generational error.

This compensation for error may be adaptively performed. If it is determined that the storage available is less than that required for allocating a buffer that can store an error picture, then the error picture is compressed and stored, or not stored at all. In addition, whether requantization is performed, and at what level, may also be adaptively determined. Thus, the principles of the present invention allow for adaptive compensation for requantization error to thereby maximize system performance.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1A illustrates a display order of an MPEG-2 video stream in accordance with the prior art;

FIG. 1B illustrates a decode order of an MPEG-2 video stream in accordance with the prior art;

FIG. 8 illustrates the time-dependent state of several buffers and illustrates how the error buffers may be time-shared if the B-pictures have only one reference picture.

DETAILED DESCRIPTION OF THE PREFERRED EMBODIMENTS

Figure 2A:
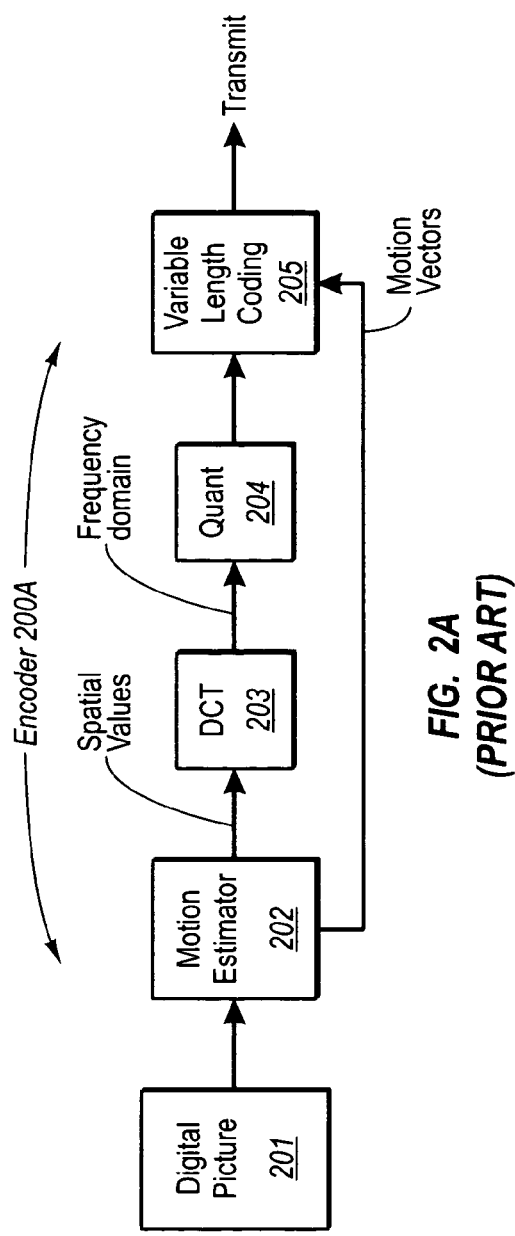
FIG. 2A illustrates an encode sequence in accordance with MPEG-2 and in accordance with the prior art.
Figure 2B:
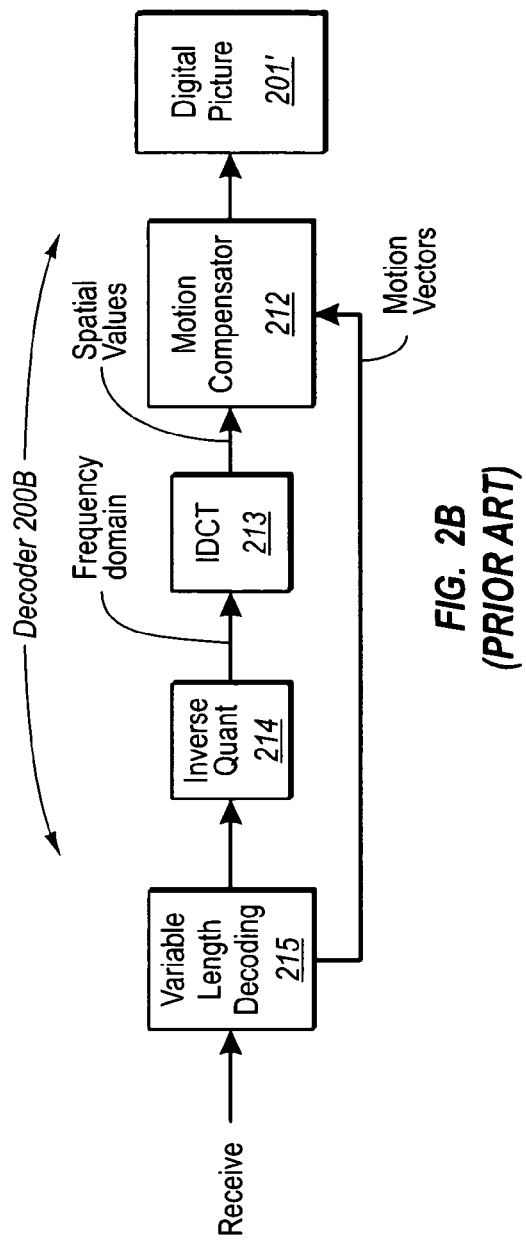
FIG. 2B illustrates a decode sequence in accordance with MPEG-2 and in accordance with the prior art.

The present invention extends to both methods and systems for at least partially avoiding generational error due to requantization of video streams, such as MPEG-2, that use predictive inter-picture motion compensation. After accessing a reference picture, inverse quantization is performed on the reference picture. Then, the reference picture is requantized at a coarser scale than was originally used when encoding the reference picture. This results in a reduction of the number of bits needed to represent the reference picture. Then, information representing the error due to the requantization is stored. Next, after accessing a predictive picture that depends on the reference picture, an altered predictive picture is calculated using the error information, the altered predictive picture at least partially compensating for the error generated by the requantization of the reference picture.

The embodiments of the present invention may comprise a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The precise operating environment in which the principles of the present invention are implemented is not important to the present invention. The principles of the present invention may be implemented in any operating environment that is able to implement the principles of the present invention. For example, given suitable software and/or adaptation, general-purpose computers, special-purpose computers or special purpose processing devices (whether now developed or to be developed in the future) might implement the principles of the present invention. In addition, the principles of the present invention may be implemented by software, hardware, firmware or any combination thereof.

Figure 3:
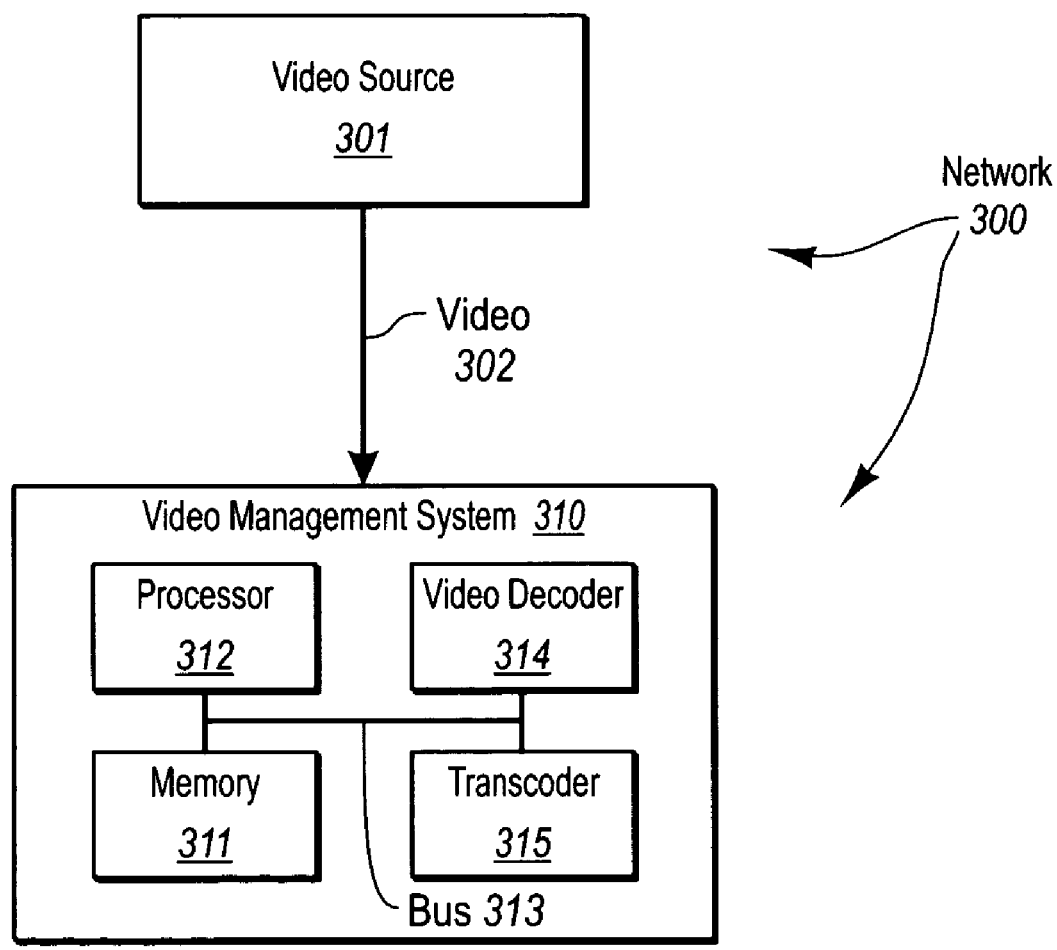
FIG. 3 schematically illustrates a video network in which the principles of the present invention may operate.

FIG. 3 and the corresponding discussion provide a general description of a network 300 in which the present invention may operate. The network 300 includes a video source 301 that provides video 302 to video management system 310 for further processing. The video management system 310 includes a memory 311 that may store the computer-executable instructions described above, and a processor 312 that is coupled to the memory 311 through, for example, a bus 313 so as to be able to execute the computer-executable instructions.

The video management system 310 also includes a video decoder 314 that decodes video in accordance with a video decoding standard such as, for example, MPEG. A transcoder 315 operates to reduce the memory and bandwidth requirements of the video 302 and may do such by implementing the principles of the present invention described herein. If the video decoder 314 and the transcoder 315 are implemented at least partially in hardware, the video decoder 314 and the transcoder 315 would be coupled to the bus 313 as shown in FIG. 3. However, as will be apparent to those of ordinary skill in the art, the principles of the present invention may be implemented by hardware, software, or a combination of hardware and software.

While FIG. 3 and the corresponding discussion above provide a general description of a suitable environment in which the invention may be implemented, it will be appreciated that the features of the present invention disclosed herein may be practiced in association with a variety of different system configurations.

In accordance with the principles of the present invention, requantization is performed in a manner that reduced generational error caused by dependencies on reference pictures that themselves were requantized. In addition, the reduction in generational error may be performed in a flexible manner. For example, perhaps the requantization occurs at a coarser scale for B-pictures in an MPEG-2 video stream since B-pictures do not act as reference pictures and thus do not introduce error into other predictive pictures. In addition, perhaps requantization is performed at a coarser scale for those P-pictures that are furthest temporally after the last I-picture, while P-pictures that are temporally just after the last I-picture have little, if any, requantization performed on them. In this manner, the degree of requantization may be customized depending on the position of the picture within the group of pictures.

Furthermore, requantization may be adjusted depending on the conditions of the network over which the requantized data is to traverse. For example, if network 300 is more congested, requantization may be performed at a maximum permissible level. On the other hand, if there is less network congestion on the network 300, a lower level of requantization may be performed. For example if the management system 310 were to deliver the requantized video to a video node over network 300, the management system 310 may monitor network traffic levels of the network 300 in determining how to perform requantization in light of current network conditions.

Figure 4:
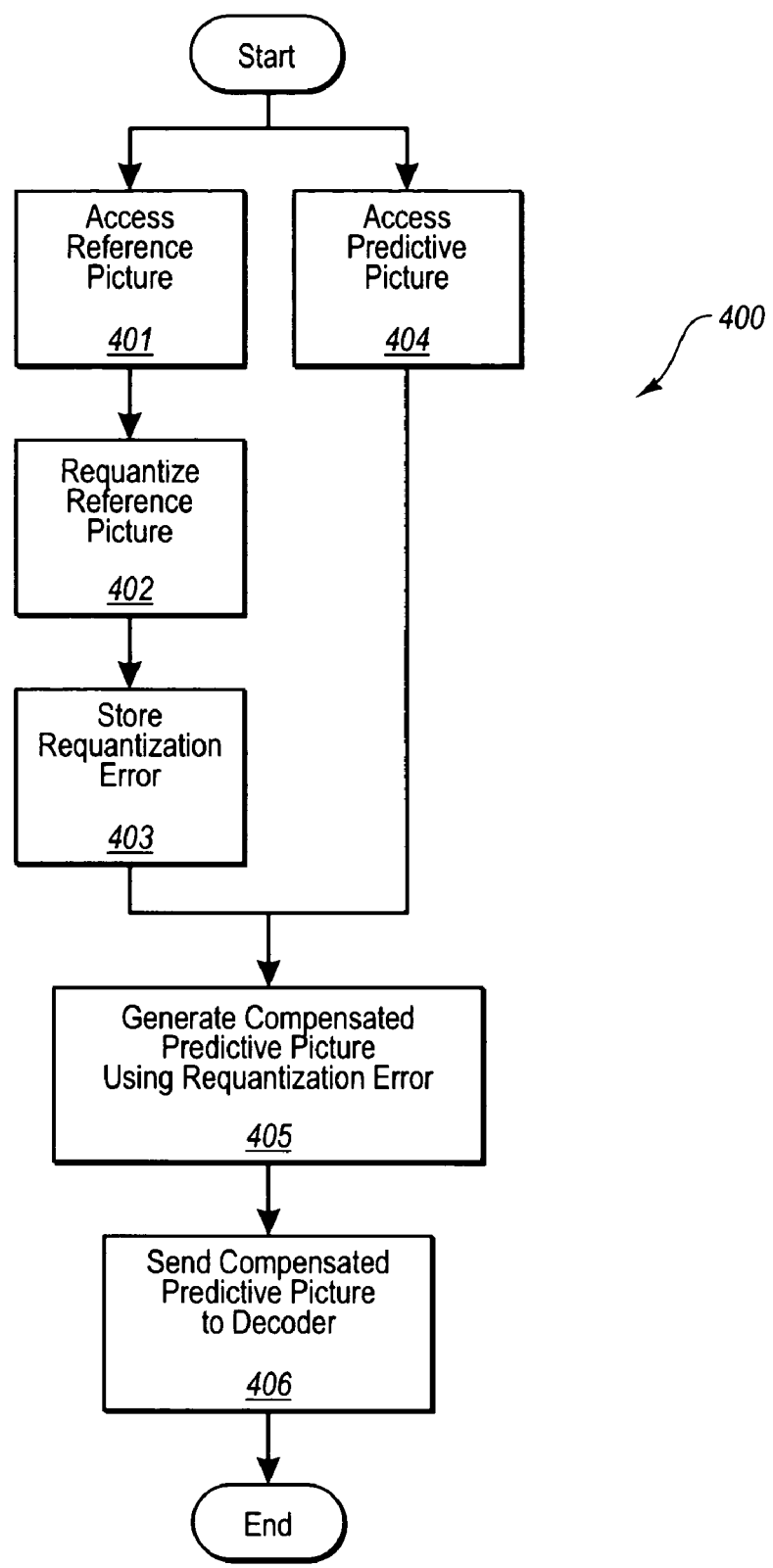
FIG. 4 is a flowchart of a method for at least partially avoiding generational error due to requantization in accordance with the present invention.

FIG. 4 illustrates a method 400 of at least partially avoiding generational error at the decoder in accordance with the present invention. The method 400 will be described with frequent reference to FIG. 5, FIG. 6 and FIG. 7, which respectively illustrate methods of the management system 310 processing I-pictures, P-pictures and B-pictures to compensate for generational requantization error.

Figure 5:
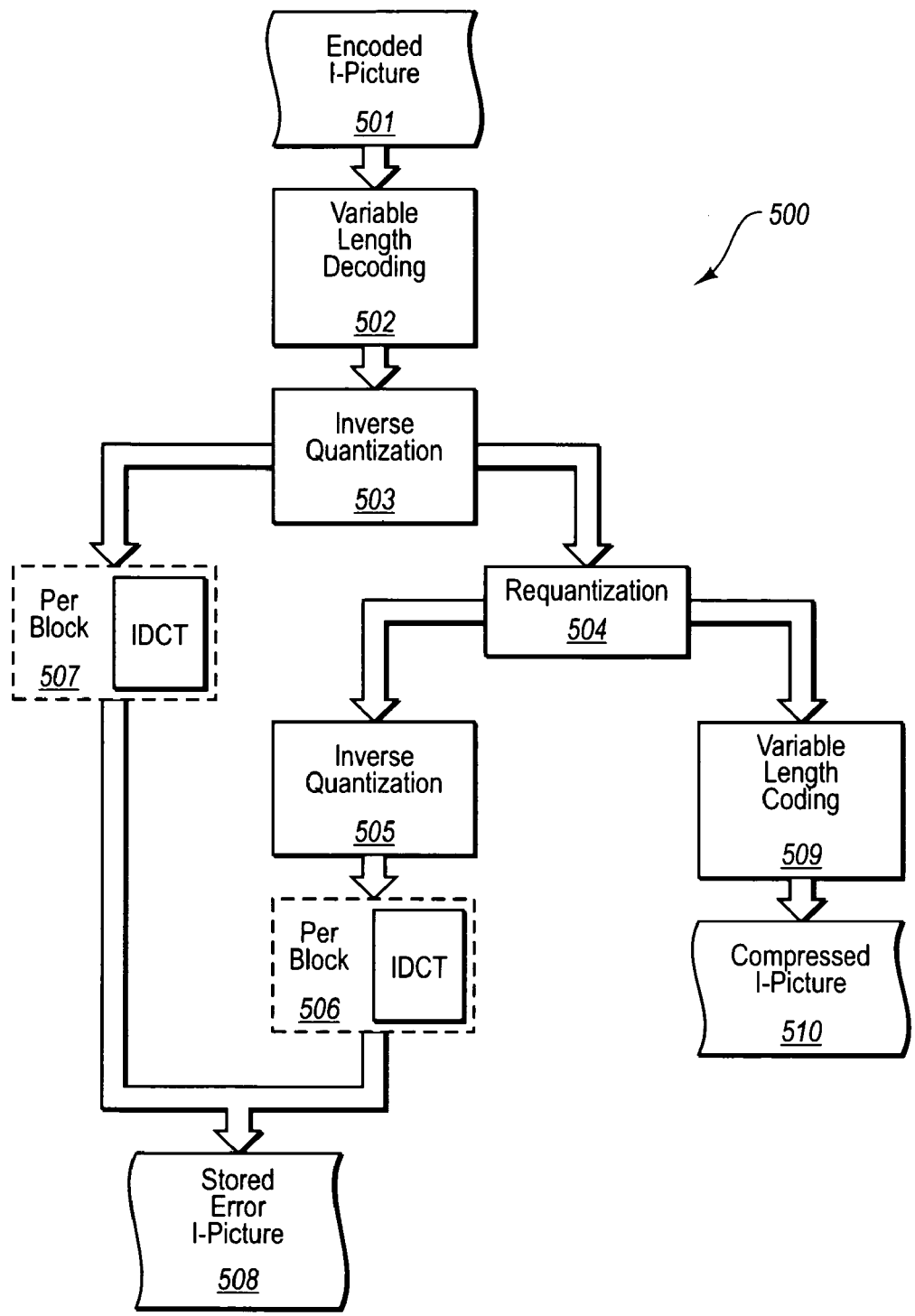
FIG. 5 is a flowchart of a method for processing an I-picture in accordance with the present invention.

In order to perform requantization on a particular video stream, the management system 310 accesses a reference picture (act 401) in the video stream. For example, FIG. 5 illustrates a method 500 for decoding an I-picture, which is often used as a reference picture under the MPEG-2 standard. The access of the reference picture (act 401) is represented in FIG. 5 by the encoded I-picture 501 being provided to the rest of the functional flow illustrated in FIG. 5.

The management system 310 may then perform a requantization algorithm (act 402) by default or in response to particular instructions received from a decision-making component in the management system 310. It may also be that the management system 310 does not perform requantization on the reference picture at all due to, for example, transient conditions resulting in abundant network bandwidth availability.

Referring to FIG. 5, in order to perform such requantization on the reference picture, the management system 310 performs variable length decoding on the I-picture 501 as in accordance with the MPEG-2 standard (act 502). Then, for each macroblock, the I-picture 501 is inverse quantized using the same scale that was used to quantize the macroblock (act 503). The quantization scale information for each macroblock in a given picture is included in any picture that is encoded using the MPEG-2 standard.

After being inverse quantized (act 503), a copy of the inverse quantized I-picture is then requantized (act 504). More specifically, each macroblock in the I-picture is requantized using a scale as coarse as or coarser than was originally used to quantize the macroblock. Although requantization is described herein as occurring to all the macroblocks in a picture, benefit may also be derived by requantizing only a portion of the picture (e.g., by requantizing only some of the macroblocks). As used herein, requantization of a picture refers to the requantization of at least a portion of the picture. This requantization reduces the size of the I-picture with some sacrifice in image quality. The level of requantization may be adjusted. For example, if there is a high level of transient network congestion, the requantization may be at a coarser level than if there is a low level of transient network congestion. Note that, in some cases, it may be possible to requantize the I-picture without separately performing inverse quantization. However, in most cases, it is more computationally efficient to inverse quantize and requantize as separate processing steps although this is not required.

Referring to FIG. 4, after performing requantization on the reference picture (act 402), the management system 310 stores information representing the error generated due to the requantization of the reference picture (act 403). Referring to FIG. 5, this may be accomplished for the I-picture by inverse quantizing the I-picture for each macroblock using the same quantization scale that was used to requantize the macroblock (act 505). Then, the I-picture is subjected on a block-by-block basis to Inverse Discrete Cosine Transformation (IDCT) (act 506) to convert the I-picture from a frequency representation to a spatial representation. Note that the output from the IDCT (act 506) represents the spatial representation of the requantized I-picture after decoding.

In order to calculate information representing the requantization error, the management system 310 also generates a spatial representation of the I-picture in which there is no requantization performed. Specifically, the management system 310 takes a copy of the inverse quantized I-picture generated by act 503, and performs block-by-block IDCT (act 507) on the I-picture to generate a version of the I-picture as it would be decoded without requantization. Note that the path represented by act 501, act 502, act 503 and act 507 may be, for example, the normal MPEG-2 decoding path illustrated in FIG. 1B. An error picture is then calculated by taking the difference between the spatial representation of the I-picture as it would be decoded after requantization and the spatial representation of the I-picture as it would be decoded without requantization, thus resulting in the stored error I-picture 508. Optionally, the error I-picture may be compressed prior to being stored. The compression may be lossy or lossless.

The management system 310 is now prepared to at least partially compensate for the error introduced by requantizing the I-picture for subsequent P-pictures or B-pictures that are predicted from the I-picture. The management system 310 transmits the requantized I-picture to the appropriate decoder that may be present in, for example, one of video nodes 320 through 323. Thus, the management system 310 performs variable length coding (act 509) on the requantized I-picture to form a compressed I-picture 510 that is compressed beyond the original compression that occurred during encoding. Thus, valuable memory and network bandwidth resources are conserved in storing and transmitting the I-picture.

Figure 6:
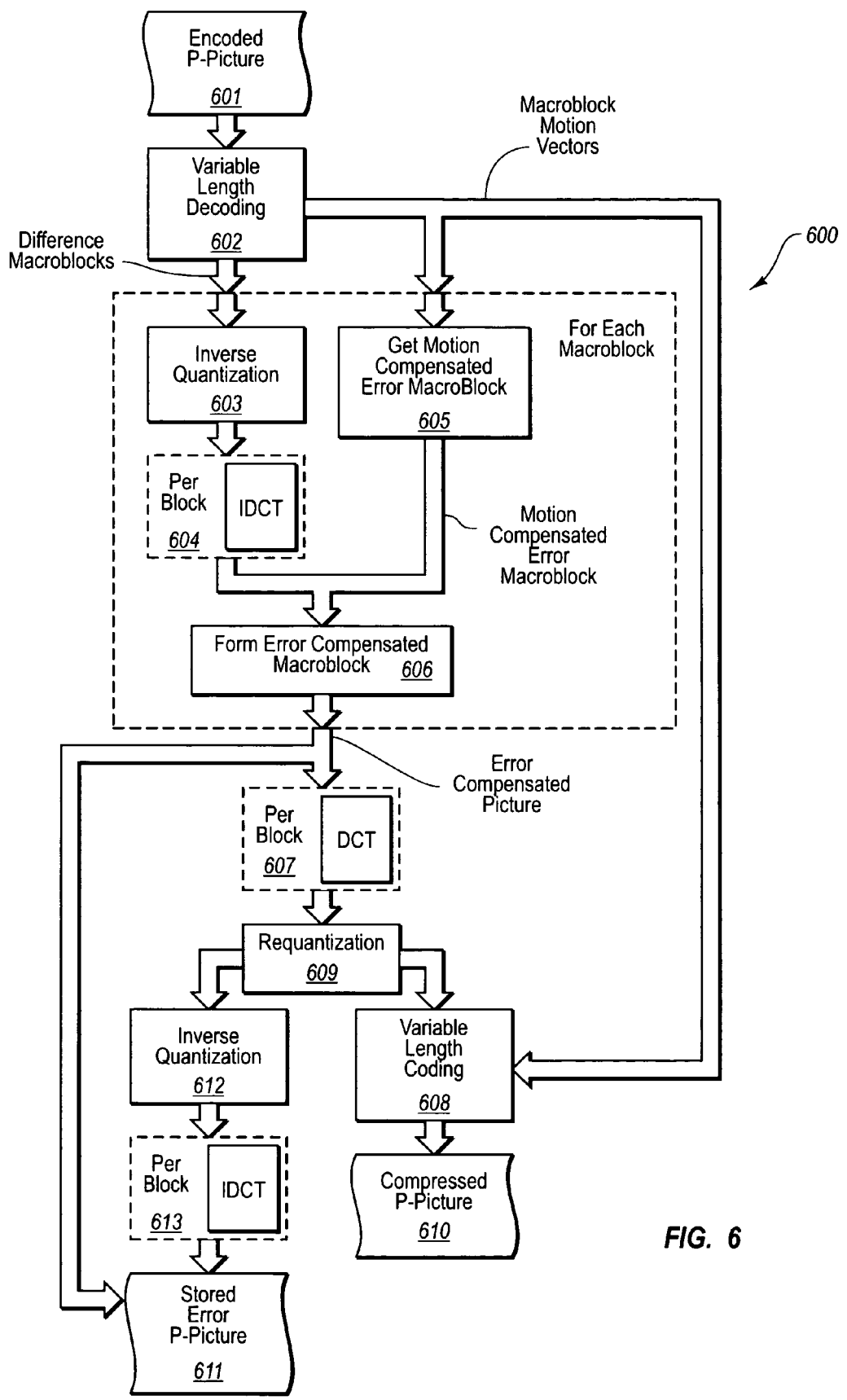
FIG. 6 is a flowchart of a method for processing a P-picture in accordance with the present invention.

Referring again to FIG. 4, the management system 310 also accesses a predictive picture (act 404) that is predicted from the reference picture. For example, FIG. 6 illustrates a method 600 of decoding of a P-picture, which is often predicted from the immediately preceding I-picture or P-picture under the MPEG-2 standard. The access of the reference picture (act 404) is represented in FIG. 6 by the encoded P-picture 601 being provided to the rest of the functional flow illustrated in FIG. 6.

Referring to FIG. 4, the management system 310 then calculates an altered predictive picture that would at least partially compensate for the error generated due to the requantization of the reference picture using the error picture of the reference picture (act 505). In FIG. 6, the elements within and above the dashed box operate together to calculating an altered predictive P-picture.

Specifically, referring to FIG. 6, the management system 310 performs variable length decoding on the P-picture 601 as in accordance with the MPEG-2 standard (act 602). The predictive P-picture is divided into component pieces that each correspond to a macroblock (a 16-pixel by 16-pixel block array). For each macroblock, there are one or more motion vectors representing motion between the macroblock in the P-picture 601 and a visually similar 16-pixel by 16-pixel block array in the reference picture. The macroblock in the predictive P-picture 601 also includes a motion compensated residual component representing the difference between the macroblock in the P-picture and the visual similar pixel block array in the reference picture.

By reducing the macroblock to motion vectors and motion compensated residual components using motion estimation, the encoder significantly reduced the size of the video stream. The video stream is assumed to arrive at the management system 310 with its predictive pictures already motion estimated. After variable length decoding, the motion vector components (labeled as "macroblock motion vectors" in FIG. 6) and the motion compensated residual components (labeled as "difference macroblocks" in FIG. 6) are then parsable and are separated to different portions of the requantization method 600.

Act 603, act 604, act 605 and act 606 are then performed for each macroblock. Specifically, for each macroblock, the corresponding difference macroblock is inverse quantized (act 603) using whatever inverse quantization scale was provided in the P-picture 601. Then inverse DCT is performed on the inverse quantized difference macroblock (act 604) to convert the difference block from a frequency domain representation of the difference macroblock to a spatial domain representation of the difference macroblock. This conversion is performed on a block-by-block basis where a block is an 8-pixel by 8-pixel block array. Of course, four different inverse DCT operations will occur to perform inverse DCT on the luma components of the macroblock, plus some more inverse DCT operations for the chroma components, the number depending on the color format. YUV 4:2:0 has 2 chroma blocks per macroblock, and YUV 4:2:2 has 4 chroma blocks per macroblock.

In addition, in order to provide suitable correction for the requantization error introduced into the reference picture, the motion vectors for the corresponding macroblock are used in order to extract the portion of the error representation of the reference frame (e.g., stored error I-picture 508) that corresponds to the visual similar 16-pixel by 16-pixel block array in the reference picture (act 605). Then, this error portion from the reference picture is added to the spatial representation of the difference macroblock generated by act 604 to form an error compensated macroblock (act 606). Repeating act 603, act 604, act 605 and act 606 for each macroblock results in an altered predictive picture that will at least partially compensate for requantization error introduced into the reference picture. Thus, decoding of the altered predictive picture will result in a predictive picture that appears more like it would had the reference picture not be requantized at all.

Referring to FIG. 4, the error compensated predictive picture is then stored or sent to the decoder (act 406). Referring to FIG. 6, this process includes performing DCT on the error compensated predictive picture (more specifically, on the motion compensated residual component of the error compensated predictive picture) (act 607). Then, the motion compensated residual component and its corresponding motion vectors are variable length coded (act 608) to generate the encoded version of the error compensated predictive picture.

If the video management system 310 determines that requantization of the P-picture is to occur, the management system 310 would also requantize the frequency representation of the motion compensated residual component of the error compensated predictive picture (act 609). In this case, the resulting encoded version of the error compensated predictive picture would be compressed as illustrated by the compressed P-picture 610.

If the management system 310 determines that requantization is to be performed, and if the predictive picture is to be used as a reference picture for other predictive pictures, and if the video management system 310 determines that the requantization error introduced into the current predictive picture is to be compensated for when generating the predictive picture that relies on the current predictive picture, then an error picture (e.g., stored error P-picture 611) is generated for use when processing the subsequent predictive picture.

In order to generate the stored error P-picture 611, the requantized version of the motion compensated residual component of the error compensated predictive picture is inverse quantized using the same quantization scales that were used to requantize (act 612). Then, the inverse quantized picture is subject to inverse DCT (act 613) to generate the spatial representation of the residual component that would be decoded without compensation for requantization error. The difference between the version of the residual component from act 606 that was not requantized and the version of the residual component from act 613 that was requantized is then calculated to be the stored error P-picture 611.

Figure 7:
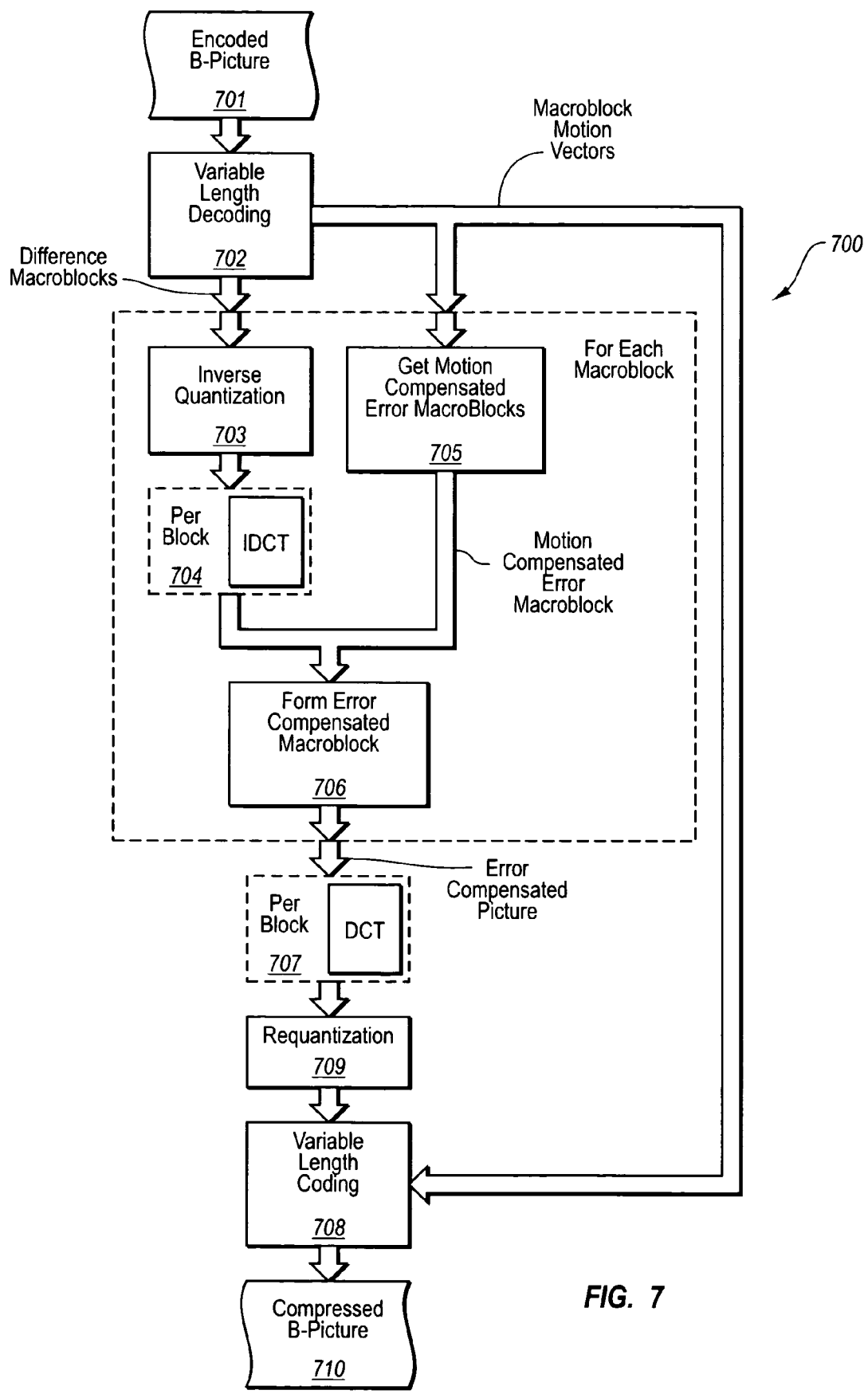
FIG. 7 is a flowchart of a method for processing a B-picture in accordance with the present invention.

FIG. 7 illustrates a method 700 of the management system 310 decoding a B-picture 701. If the video management system 310 determines that error correction is to occur for the B-picture 701 and if the requantization error for the reference pictures is stored, then the method 700 of FIG. 7 is performed. Otherwise, the conventional MPEG-2 decoding methods may be employed.

The method of decoding a B-picture illustrated in FIG. 7 is similar to the method of decoding a P-picture as illustrated in FIG. 6, except that there is no equivalent to act 612 and act 613 shown in FIG. 7 since it is not useful to calculate an error picture of the B-picture since the B-picture does not act as a reference picture.

The management system 310 calculates an altered predictive picture that would compensate for the error generated due to the requantization of the reference picture(s) using the error picture of the reference picture(s). Specifically, referring to FIG. 7, the management system 310 performs variable length decoding (act 702) on the B-picture 701 to generate the motion compensated residual components and the motion vectors. Unlike P-pictures however, a macroblock for a B-picture may include a set of motion vectors for more than one reference picture.

Act 703, act 704, act 705 and act 706 are then performed for each macroblock. Specifically, for each macroblock, the corresponding difference macroblock is inverse quantized (act 703). Then, inverse DCT is performed on the inverse quantized difference macroblock (act 704). In addition, the motion vectors for the corresponding macroblock are used in order to extract the portion of the error representation of each reference frame (e.g., stored error I-picture 508 and stored error P-picture 611) that corresponds to the visually similar 16-pixel by 16-pixel block arrays in the reference pictures (act 705). Then, these error portions from the reference pictures are added to the spatial representation of the difference macroblock generated by act 704 to form an error compensated macroblock (act 706). Repeating act 703, act 704, act 705 and act 706 for each macroblock results in an altered predictive frame that will at least partially compensate for requantization error introduced into the reference picture. Thus, decoding of the altered predictive picture will result in a predictive picture that appears closer to what it would had the reference picture not be requantized at all.

The error compensated predictive picture is then stored or sent to the decoder. The process includes performing DCT on the error compensated predictive picture (more specifically, on the motion compensated residual component of the error compensated predictive picture) (act 707). Then, the motion compensated residual component and its corresponding motion vectors are variable length coded (act 708) to generate the encoded version of the error compensated predictive picture.

If the management system 310 determines that requantization of the B-picture is to occur, the management system 310 would also requantize the frequency representation of the motion compensated residual component of the error compensated predictive picture (act 709). In this case, the resulting encoded version of the error compensated predictive picture would be compressed as illustrated by the compressed B-picture 710.

In this manner, requantization may be performed on video stream to reduce the size and bandwidth requirements of the video stream while reducing generational error caused by requantization. Also, the video management system may intelligently determine what level of requantization is to occur and whether to store error pictures based on network and storage conditions, thus providing a significant improvement over the prior state of the art.

If N streams are being transcoded simultaneously, and the number of available buffers is less than 2N, these buffers may be time-shared between the streams by reducing the extent of compensation in the streams. Reduction in compensation can be achieved by occasionally (or always) using 1-directional compensation for B frames, and occasionally using no compensation for either P frames or B frames or both. An illustrative but non-limiting example of this technique follows. FIG. 8 illustrates that the buffers that store the error picture may be time-shared if the B-picture is compensated using only one reference frame (i.e. 1-directional compensation). For instance, FIG. 8 illustrates how three video streams may be decoded using only four buffers. The state of the four buffers (identified as buffers 1 through 4) is illustrated at 15 different time segments ranging from time 0 to time 14. A "-" symbol indicates that at the corresponding time, there is no operation occurring at the corresponding buffer. An "r" symbol indicates that at the corresponding time, the buffer is read. An "I" symbol indicates that an I-picture is being written to the corresponding buffer. A "P" symbol indicates that a P-picture is being written to the corresponding buffer. The superscript of the "I" symbol and "P" symbol identifies the video stream that includes the picture.

To decode the first video stream, an error I-picture is written to buffer 1 at time 0. At time 1, the I-picture is read so that an error predictive P-picture for the first video stream may be written to buffer 2 at time 1. At time 2 and 3, the P-picture from buffer 2 is read to construct a B-picture at time 2 and time 3, respectively. At time 4, the P-picture is read from buffer 2 to construct the next P-picture in the first video stream. The resulting P-picture is written to the buffer 3 also at time 4. At time 5 and 6, the P-picture from buffer 3 is read to construct a B-picture at time 5 and time 6, respectively. At time 7, the P-picture is read from buffer 3 to construct the next P-picture in the first video stream. The resulting P-picture is written to the buffer 4 also at time 7. At time 8 and 9, the P-picture from buffer 4 is read to construct B-pictures at time 8 and time 9, respectively. At time 10, the P-picture is read from buffer 4 to construct the next P-picture in the first video stream. The resulting P-picture is written to the buffer 1 also at time 10. At time 11 and 12, the P-picture from buffer 1 is read to construct a B-picture at time 11 and time 12, respectively. At time 13, the P-picture is read from buffer 1 to construct the next P-picture in the first video stream. The resulting P-picture is written to the buffer 4 also at time 13. At time 14, the P-picture from buffer 2 is read to construct a B-picture at time 14. Error I-frames and P-frames for a second and third video stream may also be stored in these same four buffers as illustrated in FIG. 8.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a video management system that has access to a video stream that is generated using quantization and inter-picture motion compensation, the video management system further compressing the video stream by requantizing pictures within the video stream, the video management system providing the further compressed video stream to a decoder, a method of at least partially avoiding generational error at the decoder introduced by the requantization, the method comprising the following:

accessing a reference picture that has been previously quantized;

performing inverse quantization on the reference picture:

performing requantization on the reference picture using a coarser quantization scale than a quantization scale originally used to perform quantization on the reference picture;

storing information representing the error generated due to the requantization of the reference picture;

accessing a predictive picture that depends on the reference picture; and calculating an altered predictive picture that would compensate for the error generated due to the requantization of the reference picture using the information representing the error;

wherein the predictive picture is a first predicative picture and the altered predictive picture is a first altered predictive picture, and wherein the method further comprises:

performing requantization on the first altered predictive picture using a coarser quantization scale than a quantization scale originally used to perform quantization on the first predictive picture;

storing information representing the error generated due to the requantization of the first altered predictive picture; and accessing a second predictive picture that depends on the first predictive picture; and calculating a second altered predictive picture that would compensate for the error generated due to the requantization of the first altered predictive picture using the information representing the error generated due to the requantization of the first altered predictive picture.

2. A method in accordance with claim 1, further comprising: making the altered predictive picture available to the decoder.

3. A method in accordance with claim 1, further comprising the following:

providing the requantized reference picture to the decoder; and decoding the requantized reference picture.

4. A method in accordance with claim 3, further comprising the following:

performing variable length coding of the requantized reference picture prior to providing the requantized reference picture to the decoder.

5. A method in accordance with claim 1, further comprising the following:
  performing variable length decoding of the reference picture prior to performing inverse quantization on the reference picture.

6. A method in accordance with claim 1, wherein the act of storing information representing the error generated due to the requantization of the reference picture comprises the following:
  after performing inverse quantization on the reference picture, performing inverse discrete cosine transformation on a copy of the reference picture that is not subject to the act of performing requantization to generate a spatial representation of the reference picture for which requantization was not performed;
  after performing requantization on the reference picture using a coarser quantization scale, performing inverse quantization on the requantized reference picture; after performing inverse quantization on the requantized reference picture, performing inverse discrete cosine transformation of the inverse quantized requantized reference picture to generate a spatial representation of the reference picture for which requantization was performed; and
  calculating an error picture representing the difference between the spatial representation of the reference picture for which requantization was not performed and the spatial representation of the reference picture for which requantization was performed.

7. A method in accordance with claim 6, wherein the information representing the error comprises the error picture.

8. A method in accordance with claim 6, further comprising the following:
  compressing the error picture, wherein the information representing the error comprises the compressed error picture.

9. A method in accordance with claim 1, wherein the reference picture comprises a picture that was compressed as an I-picture in accordance with a Moving Pictures Experts Group (MPEG) standard.

10. A method in accordance with claim 1, wherein the reference picture comprises a picture that was compressed as a P-picture in accordance with a Moving Pictures Experts Group (MPEG) standard.

11. A method in accordance with claim 1, further comprising the following
  providing the second altered predictive frame to the decoder.

12. A method in accordance with claim 1, wherein the reference picture comprises a picture that was compressed as an I-picture in accordance with a Moving Pictures Experts Group (MPEG) standard.

13. A method in accordance with claim 12, wherein the first predictive picture comprises a picture that was compressed as a P-picture in accordance with a Moving Pictures Experts Group (MPEG) standard.

14. A method in accordance with claim 13, wherein the second predictive picture comprises a picture that was compressed as a B-picture in accordance with a Moving Pictures Experts Group (MPEG) standard.

15. A method in accordance with claim 1, further comprising the following:
  requantizing the second altered predictive picture;
  providing the requantized second altered predictive picture to the decoder.

16. In a video management system that has access to a video stream that is generated using quantization and inter-picture motion compensation, the video management system further compressing the video stream by requantizing pictures within the video stream, the video management system providing the further compressed video stream to a decoder, a computer program product for implementing a method of at least partially avoiding generational error at the decoder introduced by the requantization, the computer program product comprising a computer-readable storage medium having stored thereon computer-executable instructions for implementing the following to be performed by the video management system:
  accessing a reference picture;
  performing inverse quantization on the reference picture;
  performing requantization on the reference picture using a coarser quantization scale than a quantization scale originally used to perform quantization on the reference picture;
  storing information representing the error generated due to the requantization of the reference picture;
  accessing a predictive picture that depends on the reference picture; and
  calculating an altered predictive picture that would compensate for the error generated due to the requantization of the reference picture using the information representing the error;
  wherein the predictive picture is a first predicative picture and the altered predictive picture is a first altered predictive picture, and wherein the method further comprises:
  performing requantization on the first altered predictive picture using a coarser quantization scale than a quantization scale originally used to perform quantization on the first predictive picture;
  storing information representing the error generated due to the requantization of the first altered predictive picture; and
  accessing a second predictive picture that depends on the first predictive picture; and
  calculating a second altered predictive picture that would compensate for the error generated due to the requantization of the first altered predictive picture using the information representing the error generated due to the requantization of the first altered predictive picture.

17. A computer program product in accordance with claim 16, wherein the computer-readable medium further has stored thereon computer-executable instructions for implementing the following:
  making the altered predictive picture available to the decoder.

18. In a video management system that has access to a video stream that is generated using quantization and inter-picture motion compensation, the video management system further compressing the video stream by requantizing pictures within the video stream, the video management system providing the further compressed video stream to a decoder, a method of at least partially avoiding generational error at the decoder introduced by the requantization, the method comprising the following:
  accessing a reference picture that has been previously quantized;
  performing inverse quantization on the reference picture;
  performing requantization on the reference picture using a coarser quantization scale than a quantization scale originally used to perform quantization on the reference picture;
  if storage capacity is available, storing information representing the error generated due to the requantization of the reference picture, and if not, then compressing the information representing the error prior to storage;

accessing a predictive picture that depends on the reference picture; and calculating an altered predictive picture that would compensate for the error generated due to the requantization of the reference picture using the information representing the error;

wherein the predictive picture is a first predicative picture and the altered predictive picture is a first altered predictive picture, and wherein the method further comprises:

performing requantization on the first altered predictive picture using a coarser quantization scale than a quantization scale originally used to perform quantization on the first predictive picture;

storing information representing the error generated due to the requantization of the first altered predictive picture; and accessing a second predictive picture that depends on the first predictive picture; and calculating a second altered predictive picture that would compensate for the error generated due to the requantization of the first altered predictive picture using the information representing the error generated due to the requantization of the first altered predictive picture.

19. In a video management system that has access to a video stream that is generated using quantization and inter-picture motion compensation, the video management system further compressing the video stream by requantizing pictures within the video stream, the video management system providing the further compressed video stream to a decoder, a computer program product for implementing a method of at least partially avoiding generational error at the decoder introduced by the requantization, the computer program product comprising a computer readable storage medium for storing executable instructions for implementing the method, and wherein the implemented method comprises:

accessing a reference picture that has been previously quantized;

performing inverse quantization on the reference picture;

performing requantization on the reference picture using a coarser quantization scale than a quantization scale originally used to perform quantization on the reference picture;

if storage capacity is available, storing information representing an error generated due to the requantization of the reference picture, and if not, then compressing the information representing the error prior to storage;

accessing a predictive picture that depends on the reference picture; and calculating an altered predictive picture that would compensate for the error generated due to the requantization of the reference picture using the information representing the error;

wherein the predictive picture is a first predicative picture and the altered predictive picture is a first altered predictive picture, and wherein the method further comprises:

performing requantization on the first altered predictive picture using a coarser quantization scale than the quantization scale originally used to perform quantization on the first predictive picture;

storing information representing the error generated due to the requantization of the first altered predictive picture;

accessing a second predictive picture that depends on the first predictive picture; and calculating a second altered predictive picture that would compensate for the error generated due to the requantization of the first altered predictive picture using the information representing the error generated due to the requantization of the first altered predictive picture.

20. A method in accordance with claims 18 or 19, further comprising:
making the altered predictive picture available to the decoder.

21. A method in accordance with claims 18 or 19, further comprising the following:
providing the requantized reference picture to the decoder; and
decoding the requantized reference picture.

22. A method in accordance with claim 21, further comprising the following:
performing variable length coding of the requantized reference picture prior to providing the requantized reference picture to the decoder.

23. A method in accordance with claims 18 or 19, further comprising the following:
performing variable length decoding of the reference picture prior to performing inverse quantization on the reference picture.

24. A method in accordance with claims 18 or 19, wherein the act of storing information representing the error generated due to the requantization of the reference picture comprises the following:
after performing inverse quantization on the reference picture, performing inverse discrete cosine transformation on a copy of the reference picture that is not subject to the act of performing requantization to generate a spatial representation of the reference picture for which requantization was not performed;
after performing requantization on the reference picture using a coarser quantization scale, performing inverse quantization on the requantized reference picture;
after performing inverse quantization on the requantized reference picture, performing inverse discrete cosine transformation of the inverse quantized requantized reference picture to generate a spatial representation of the reference picture for which requantization was performed; and
calculating an error picture representing the difference between the spatial representation of the reference picture for which requantization was not performed and the spatial representation of the reference picture for which requantization was performed.

25. A method in accordance with claims 18 or 19, further comprising the following:
providing the second altered predictive frame to the decoder.

26. A method in accordance with claims 18 or 19, further comprising the following:
requantizing the second altered predictive picture;
providing the requantized second altered predictive picture to the decoder.

27. In a video management system that has access to a video stream that is generated using quantization and inter-picture motion compensation, the video management system further compressing the video stream by requantizing pictures within the video stream, the video management system providing the further compressed video stream to a decoder, a method of at least partially avoiding generational error at the decoder introduced by the requantization, comprising:

accessing a reference picture that has been previously quantized;

performing inverse quantization on the reference picture;

performing requantization on the reference picture using a coarser quantization scale than a quantization scale originally used to perform quantization on the reference picture, and wherein whether said requantization is performed depends on the type of reference picture, namely, whether the reference picture is an I-picture, a P-picture or a B-picture;

storing information representing the error generated due to the requantization of the reference picture;

accessing a predictive picture that depends on the reference picture; and calculating an altered predictive picture that would compensate for the error generated due to the requantization of the reference picture using the information representing the error;

wherein the predictive picture is a first predicative picture and the altered predictive picture is a first altered predictive picture, and wherein the method further comprises:

performing requantization on the first altered predictive picture using a coarser quantization scale than a quantization scale originally used to perform quantization on the first predictive picture;

storing information representing the error generated due to the requantization of the first altered predictive picture; and accessing a second predictive picture that depends on the first predictive picture; and calculating a second altered predictive picture that would compensate for the error generated due to the requantization of the first altered predictive picture using the information representing the error generated due to the requantization of the first altered predictive picture.

28. In a video management system that has access to a video stream that is generated using quantization and inter-picture motion compensation, the video management system further compressing the video stream by requantizing pictures within the video stream, the video management system providing the further compressed video stream to a decoder, a computer program product for implementing a method of at least partially avoiding generational error at the decoder introduced by the requantization, the computer program product comprising a computer readable medium for storing executable instructions for implementing the method, and wherein the implemented method comprises:

accessing a reference picture that has been previously quantized;

performing inverse quantization on the reference picture;

performing requantization on the reference picture using a coarser quantization scale than a quantization scale originally used to perform quantization on the reference picture, and wherein whether said requantization is performed depends on the type of reference picture, namely, whether the reference picture is an I-picture, a P-picture or a B-picture;

storing information representing the error generated due to the requantization of the reference picture;

accessing a predictive picture that depends on the reference picture; and calculating an altered predictive picture that would compensate for the error generated due to the requantization of the reference picture using the information representing the error;

wherein the predictive picture is a first predicative picture and the altered predictive picture is a first altered predictive picture, and wherein the method further comprises:

performing requantization on the first altered predictive picture using a coarser quantization scale than a quantization scale originally used to perform quantization on the first predictive picture;

storing information representing the error generated due to the requantization of the first altered predictive picture; and accessing a second predictive picture that depends on the first predictive picture; and calculating a second altered predictive picture that would compensate for the error generated due to the requantization of the first altered predictive picture using the information representing the error generated due to the requantization of the first altered predictive picture.

29. A method in accordance with claims 27 or 28, further comprising: making the altered predictive picture available to the decoder.

30. A method in accordance with claims 27 or 28, further comprising the following:

providing the requantized reference picture to the decoder; and decoding the requantized reference picture.

31. A method in accordance with claim 30, further comprising the following:

performing variable length coding of the requantized reference picture prior to providing the requantized reference picture to the decoder.

32. A method in accordance with claims 27 or 28, further comprising the following:

performing variable length decoding of the reference picture prior to performing inverse quantization on the reference picture.

33. A method in accordance with claims 27 or 28, wherein the act of storing information representing the error generated due to the requantization of the reference picture comprises the following:

after performing inverse quantization on the reference picture, performing inverse discrete cosine transformation on a copy of the reference picture that is not subject to the act of performing requantization to generate a spatial representation of the reference picture for which requantization was not performed;

after performing requantization on the reference picture using a coarser quantization scale, performing inverse quantization on the requantized reference picture;

after performing inverse quantization on the requantized reference picture, performing inverse discrete cosine transformation of the inverse quantized requantized reference picture to generate a spatial representation of the reference picture for which requantization was performed; and calculating an error picture representing the difference between the spatial representation of the reference picture for which requantization was not performed and the spatial representation of the reference picture for which requantization was performed.

34. A method in accordance with claim 28, further comprising the following:

providing the second altered predictive frame to the decoder.

35. A method in accordance with claim 28, further comprising the following:

requantizing the second altered predictive picture;

providing the requantized second altered predictive picture to the decoder.

36. In a video management system that has access to a video stream that is generated using quantization and inter-picture motion compensation, the video management system further compressing the video stream by requantizing pictures within the video stream, the video management system providing the further compressed video stream to a decoder, a method of at least partially avoiding generational error at the decoder introduced by the requantization, the method comprising the following:

accessing a reference picture that has been previously quantized;

performing inverse quantization on the reference picture:

performing requantization on the reference picture using a coarser quantization scale than a quantization scale originally used to perform quantization on the reference picture;

storing information representing the error generated due to the requantization of the reference picture;

accessing a predictive picture that depends on the reference picture, the predictive picture including at least one macroblock having at least one motion vector representing estimated motion between the macroblock and a visually similar component piece within the reference picture, the macroblock further including a motion compensated residual component representing a difference between the macroblock in the predictive picture and the visually similar component piece in the reference picture; and creating an altered predictive picture that represents an approximation of the predictive picture as the predictive picture would appear after decoding if the reference picture were not requantized and that compensates for error generated due to the requantization of the reference picture, wherein the altered predictive picture is created by at least using the motion vector of the predictive picture to reference and extract a portion of the stored information representing an error corresponding to the visually similar component in the reference picture and adding the motion compensated residual component to the extracted portion of the stored information.

\* \* \* \* \*